Sept. 11, 1951     L. A. BLACKMUN     2,567,867
PROCESS FOR DESULFURIZING OF SEARLES LAKE BRINE
Filed Oct. 4, 1946
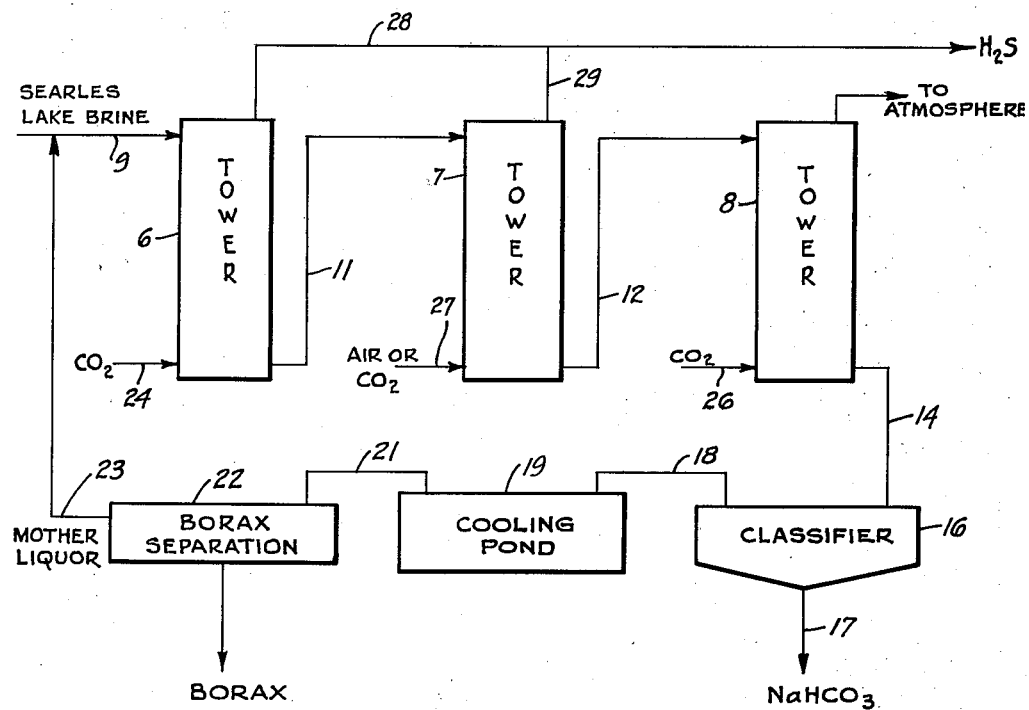
INVENTOR.
LYNN A. BLACKMUN
BY
ATTORNEY Patented Sept. 11, 1951

2,567,867

UNITED STATES PATENT OFFICE 2,567,867

PROCESS FOR DESULFURIZING OF SEARLES LAKE BRINE

Lynn A. Blackmun, Westend, Calif., assignor to West End Chemical Company, a corporation of California Application October 4, 1946, Serial No. 701,219

3 Claims. (Cl. 23—40)

This invention relates to the treatment of a complex brine such as that found at Searles Lake, California, to the end that one or more valuable constituents of the brine can be recovered, such as sodium carbonate, sodium bicarbonate, sodium sulphate, potassium chloride or borax. Teeple in "The Industrial Development of Searles Lake Brine" (The Chemical Catalog Company, Inc., 1929) gives various brine compositions as taken from different depths in the same well. In none of these does Teeple report the presence of any sulphide; in another analysis, stated to be rather complete and to have been made in 1925, Teeple reports the presence of 0.020% of sodium sulphide by weight. It has generally been considered that Searles Lake brine has been substantially free of any sulphide. Recently, however, in working with this brine, I have observed that sodium sulphide is present in amounts from 0.2% to in excess of 0.3% by weight, particularly as one utilizes the brine taken from deep in the lake. The presence of this sulphide is objectionable, interfering with the practice of the various recovery processes which have been developed, creating a health problem, increasing the corrosion on the equipment and other obvious difficulties and hazards.

I have discovered that by acidifying the brine and therefter passing a gas through the brine, the sulphide content of the brine can be lowered and any hydrogen sulphide evolved removed, so that thereafter the brine can be processed in any suitable manner, as heretofore, without the later harmful evolution of hydrogen sulphide or interference on the part of the relatively small remaining sulphide content. The alkalinity of the brine, as recovered from the lake, and expressed in terms of pH, is usually about pH 10. I have found that by acidifying the brine and lowering the pH generally to below pH 9 and usually between about pH 8 and pH 9, that the major portion of the sulphide is converted to hydrogen sulphide which can then be removed from the brine so that thereafter the brine can be suitably processed to recover the remaining valuable constituents. In addition, I have found that the mother liquor remaining after the treatment of the brine can usually be suitably mixed with the brine because such mother liquors ordinarily contain valuable constituents and because such mother liquors usually have a pH lower than that of the naturally occurring brine as taken from the lake. Thus, mixing of a portion of a lake brine with a portion of the recovered mother liquor reduces the pH of the brine so that less acidification is necessary to reduce the brine pH to that at which the hydrogen sulphide is evolved. As a suitable acidifying medium, I have successfully utilized carbon dioxide since this is relatively inexpensive and is effective to reduce the alkalinity of the brine, enabling additional sodium carbonate or sodium bicarbonate to be eventually recovered as such from the brine. Sweeping out of evolved hydrogen sulphide can either be effected with a stream of carbon dioxide gas, by blowing with air or by heating the brine; this last step is generally not preferred in view of the expense involved in heating the mass of relatively dilute brine.

After the acidity of the brine has been reduced and the evolved hydrogen sulphide removed, the quantity of sulphide remaining is usually less than 0.05% and so insignificant that it does not interfere with any subsequent operation which may be practiced upon the brine to recover the valuable constituents thereof such as potassium chloride, borax, sodium carbonate, sodium bicarbonate, or sodium sulphate.

To outline in a general way the practice of the process of this invention, a quantity of Searles Lake brine is passed successively through a series of towers in which liquid-gas contact is effected, the brine being introduced at the top of each tower to fall countercurrent to an ascending gas stream. If desired, the brine introduced may be mixed with a suitable portion of mother liquor previously derived from a recovery operation. In the first and second towers, acidification of the brine is effected and the pH of the brine is lowered so that hydrogen sulphide is evolved in each tower and is carried out in the exit gas. The gas released at the top of each tower is collected and, for obvious reasons, is introduced into a suitable furnace so that the hydrogen sulphide content thereof may be burned or the hydrogen sulphide is removed as by scrubbing the gas stream with lime water. Brine taken from the base of the second tower will contain only about 0.04% of sulphide as sodium sulphide by weight. This brine is suitable for recovery of the various constituents in any of the well known processes, e. g., for further carbonation, for example, to convert the sodium carbonate present to sodium bicarbonate for recovery as such, after which the borax content of the brine may be recovered upon cooling as is set forth in the patents to Hellmers Nos. 1,756,122 and 1,733,537 issued on April 29, 1930, and October 29, 1929, respectively.

In place of introducing carbon dioxide into each of the several towers, carbon dioxide can be introduced into one or more of the first towers and in the last tower and a stream of air introduced at the base of an intermediate tower to sweep out of the brine any hydrogen sulphide evolved; this operation is feasible when the extent of carbonation effected in the first tower or towers is sufficient to adjust the pH sufficiently so that the major portion of the hydrogen sulphide is released and can be swept out by the air stream in the intermediate tower.

The addition to the deep lake brine of mother liquor, previously derived from a treatment of the brine, has been mentioned. In case it is desired to recover the carbonate value from the brine, this dilution is particularly important, as I will now explain. If one carbonates the deep lake brine without suitable dilution, the precipitation of sodium sesquicarbonate $$(Na_2CO_3.NaHCO_3.2H_2O)$$

follows. This material is unstable and its production is generally considered undesirable. It forms when, other things being equal, the pH of the brine and the concentration of the sodium carbonate in the brine are each too high; under these conditions, the solid phase of the sequicarbonate is stable in the brine and, as a consequence, forms upon carbonation. By diluting the brine with a lake surface brine, a suitable mother liquor or any suitable brine containing an adequate concentration of sodium chloride, the pH and the sodium carbonate concentration are each lowered until the brine is in a region wherein sodium bicarbonate forms as the solid phase upon carbonation, for example as in Patents 1,733,537 and 1,756,122.

In the deep lake brine with which I have worked heretofore, I have found that when the pH was in excess of 9.8 and the brine contained more than about 5.5% sodium carbonate, the sequicarbonate would form as the stable solid phase upon carbonation until the carbonate content and the pH had been lowered into that region wherein the bicarbonate formed; one would then have an obviously undesirable mixture of the two. The pH value and the sodium carbonate content which I have found critical may not apply specifically to all deep lake brines from Searles Lake; if they do not, other different values will apply. In any case, it is necessary to alter the pH and sodium carbonate concentration in the deep lake brine composition so that, upon subsequent carbonation, the stable solid phase formed is the bicarbonate and not the sesquicarbonate. This necessity exists whether or not the sulphide content is excessive.

The practice of the present invention will become further apparent upon considering the following illustrative examples of the practice of my invention in conjunction with the drawing which accompanies and forms a part hereof and in which the single figure is a diagrammatic representation of suitable apparatus which can be employed and the various steps which are contemplated by the process of this invention.

Referring to the drawing, I have indicated there are three countercurrent liquid gas contact towers 6, 7 and 8 although more can be utilized or even only two towers. Searles Lake brine containing sulphide is introduced at the top of tower 6 through line 9, passing over through line 11 to the top of tower 7 and then, from the base of tower 7 through line 12, to the top of tower 8. From the base of tower 8, the brine is taken through line 14 into a classifier 16 wherein sodium bicarbonate crystals settle and are taken off at the bottom of the classifier through line 17, the remaining liquid passing through line 18 to a suitable cooling device 19 such as a cooling pond wherein the temperature of the brine is lowered to a point whereat borax crystallization occurs, the brine passing from the cooling pond through line 21 into a suitable borax separation operation indicated generally by numeral 22. The remaining mother liquor is taken off and may be returned through line 23 to the brine inlet line 9. Carbon dioxide is introduced as at 24 into the base of tower 6 and as 26 into the base of tower 8. Air or carbon dioxide is introduced through line 27 into the base of tower 7. The gas issuing from towers 6 and 7 is collected by lines 28 and 29 and is taken off for suitable disposal while that gas emitted from tower 8 is released directly to the atmosphere.

As illustrative of the practice of the process of the present invention, lake brine of the following composition was utilized:

| | | |
|---|---|---|
| $Na_2CO_3$ | per cent | 7.54 |
| $Na_2B_4O_7.10H_2O$ | do | 4.25 |
| Cl | do | 11.34 |
| $SO_4$ | do | 3.72 |
| $Na_2S$ | do | 0.307 |
| pH | | 10.18 |

This lake brine was mixed with mother liquor previously derived from the process and having the following composition:

| | | |
|---|---|---|
| $Na_2CO_3$ | per cent | 1.46 |
| $Na_2B_4O_7.10H_2O$ | do | 1.20 |
| Cl | do | 11.76 |
| $SO_4$ | do | 4.08 |
| $Na_2S$ | do | 0.0555 |
| pH | | 8.5 |

The two brines were mixed in the proportion of two parts of the lake brine to one part of the mother liquor to produce a mixed brine having a pH of 9.7. This brine was then introduced through line 9 into tower 6 and carbonated, the brine issuing from the tower having a pH of 9.15. Air was introduced into tower 7 to sweep out the hydrogen sulphide evolved after which the partially carbonated brine was passed through line 12 into tower 8 wherein the brine was further carbonated to convert the sodium carbonate present to sodium bicrabonate.

The sodium sulphide content of the original lake brine was 0.307% while that of the mixed brine introduced through line 9 was 0.23%. After carbonation and aeration, the sodium sulphide content was reduced to 0.066%. The brine was relatively stable for the sodium sulphide content of the brine passing through line 14 was 0.05%. In classifier 16, the sodium bicarbonate crystals settled out and were separated and removed, the remaining brine being sent to the cooling pond and then passed on for subsequent borax separation in accordance with the aforementioned Hellmers' patents.

In another operation conducted in accordance with this invention, a similar brine was introduced and was circulated through towers 6, 7 and 8, carbon dioxide being introduced at the base of each tower. The brine introduced into tower 6 was a deep lake brine mixed with a mother liquor to produce a brine having a pH of 9.82 and contained 0.15% sodium sulphide by weight. The brine issuing from tower 7 through line 12 had a pH of 8.8 and contained only 0.04% sodium sulphide; the brine passing through line 14 had the same sodium sulphide content, that is, 0.04%.

The hydrogen sulphide taken off through line 28 can be passed to a lime water absorber or can be introduced into a suitable furnace to burn the hydrogen sulphide present.

If the removal of the sulphide is all that is desired and if a suitable sulphide free brine having a more acidic pH is not available, the dilution step need not be practiced for the deep lake brine can be carbonated and then aerated or carbonated to sweep out the liberated $H_2S$; if this is done, sesquicarbonate and not bicarbonate may be formed upon further carbonation of the brine.

I claim:

1. A process for treatment of raw Searles Lake brine as derived from the lake and containing at least 0.02% metallic sulfides and having a pH of about 10 consisting in carbonating the raw lake brine to lower the pH thereof to about 9, said carbonation being insufficient to produce a precipitation of sodium bicarbonate in the brine, and then passing a gas selected from the group consisting of carbon dioxide and air through the brine to sweep out hydrogen sulfide substantially completely.

2. A process for the treatment of raw Searles Lake brine as derived from the lake and containing at least 0.02% metallic sulfides and having a pH of about 10, consisting in passing carbon dioxide into raw lake brine in an amount sufficient to lower the pH of the raw lake brine to about 9 and continuing to pass carbon dioxide through the acidified brine to sweep out of the brine substantially completely hydrogen sulfide liberated from the brine upon said carbonation, the quantity of carbon dioxide being insufficient to cause precipitation of sodium bicarbonate in the brine.

3. In a process of treating raw Searles Lake brine having a pH of about 10 and being contaminated with at least 0.02% of metallic sulfides, to recover valuable constituents therefrom, the improvement consisting in the step of passing carbonic acid gas into said raw Searles Lake brine prior to carbonation of the brine to precipitate a carbonate, and passing a gas selected from the group consisting of air and carbon dioxide through the so carbonated brine to sweep out $H_2S$ released upon lowering of the pH of the brine to between about 8 and 9, the quantity of carbonic acid gas passed into the bring being sufficient to lower the pH of the brine to between about 8 and 9 and being insufficient to precipitate carbonate in the brine.

LYNN A. BLACKMUN.

REFERENCES CITED

The following references are of record in the file of this patent:

UNITED STATES PATENTS

| Number | Name | Date |
|---|---|---|
| 357,824 | Hawliczek | Feb. 15, 1887 |
| 384,884 | Wood | June 19, 1888 |
| 1,308,899 | Fuentes | July 8, 1919 |
| 1,350,089 | Wrinkle et al. | Aug. 17, 1920 |
| 1,350,090 | Wrinkle et al. | Aug. 17, 1920 |
| 1,492,920 | Knight | May 6, 1924 |
| 1,598,985 | Petit | Sept. 7, 1926 |
| 1,748,739 | Sundstrom et al. | Feb. 25, 1930 |
| 1,756,122 | Hellmers | Apr. 29, 1930 |
| 1,865,833 | Chesny | July 5, 1932 |
| 1,929,902 | Robson | Oct. 10, 1933 |
| 1,983,789 | Bradley et al. | Dec. 11, 1934 |
| 2,005,868 | MacMullin | June 25, 1935 |
| 2,105,109 | Dolley | Jan. 11, 1938 |

FOREIGN PATENTS

| Number | Country | Date |
|---|---|---|
| 345,873 | Great Britain | Apr. 2, 1930 |